SYNCHRONOUS DATA REPEATER HAVING NONCOMPATIBLE SIGNAL BYPASS

Filed Dec. 28, 1966 Sheet 1 of 2

INVENTORS F. K. CREASY
R. L. HORLACHER
M. A. LOGAN
L. M. SMITH
W. R. YOUNG, JR.

BY R C Lipton
ATTORNEY

United States Patent Office 3,440,337

Patented Apr. 22, 1969

3,440,337

SYNCHRONOUS DATA REPEATER HAVING NON-COMPATIBLE SIGNAL BYPASS

Fred K. Creasy, Matawan, Robert L. Horlacher and Mason A. Logan, Colts Neck, Larrabee M. Smith, Holmdel, and William Rae Young, Jr., Middletown, N.J., assignors to Bell Telephone Laboratories, Incorporated, Murray Hill, N.J., a corporation of New York Filed Dec. 28, 1966, Ser. No. 605,305
Int. Cl. H04l 15/00
U.S. Cl. 178—4 3 Claims This invention relates to regenerators for synchronous data transmission systems and, more particularly, to data repeaters having bypass paths for passing signals around the repeater when the system is conveying signals which are not compatible with the operation of the repeater.

In transmission systems wherein data is transmitted over a transmission channel subject to loss in signal level, amplitude and delay distortion and noise, data repeaters are inserted in the channel to regenerate the signals to overcome these adverse effects. Preferably, the repeater includes a back-to-back receiver and transmitter. The receiver recovers the data stream from the incoming channel signals and passes the data to the transmitter which retransmits the data signals to the outgoing channel. When desired, the recovered data stream can also be tapped by local stations or subscriber lines.

The transmission system may also provide channels for other forms of signaling, analog or digital and, of course, may periodically be subject to noise. These other forms are not compatible with the operation of the channel repeater and are, therefore, generally filtered out or eliminated by the receiver. These non-compatible signals must nevertheless be forwarded on the channel, preferably by bypassing the signals around the repeater and thence to the outgoing channel.

Bother the receiver and the transmitter inherently delay the signals upon which they operate. The delay, however, is generally maintained uniform during the transmitting time interval with the exception of the intervals when the signals are bypassed around the repeater, the bypass path normally presenting negligible delay to the signals. This presents a problem relative to the initial data signals in a data stream since the bypass path is not opened until compatible signals are recognized, thus permitting these initial signals to be bypassed, resulting in a difference in the relative delay of the signals and a significant phase shift of the data stream signals when the bypass path is opened. This phase shift presents problems to terminating customer equipment, such as timing signal recovery circuits.

Accordingly, it is an object of this invention to alternatively pass signals through and around a repeater having inherent delay without relative phase shift of the signals.

In accordance with an illustrative embodiment of this invention, a delay path for the data signals in connected external to but in series with both the receiver and the transmitter of the repeater. The delay of each path is adjusted to provide with the receiver and the transmitter, individually and therefore collectively, a cumulative delay equal to an integral number of data signal intervals. Accordingly, the relative difference in delay between the repeater and the bypass path is an interval equal to a multiple of the data signal interval whereby the relative phase of the signals is not shifted when the bypass path is opened or closed. In addition, since the receiver presents a delay corresponding to a multiple of the data signal interval, a local station can tap the recovered data stream and monitor the line signals without being subject to signal phase shift.

The foregoing and other objects and features of this invention will be fully understood from the following description of an illustrative embodiment thereof taken in conjunction with the accompanying drawings wherein.

Figure 1:
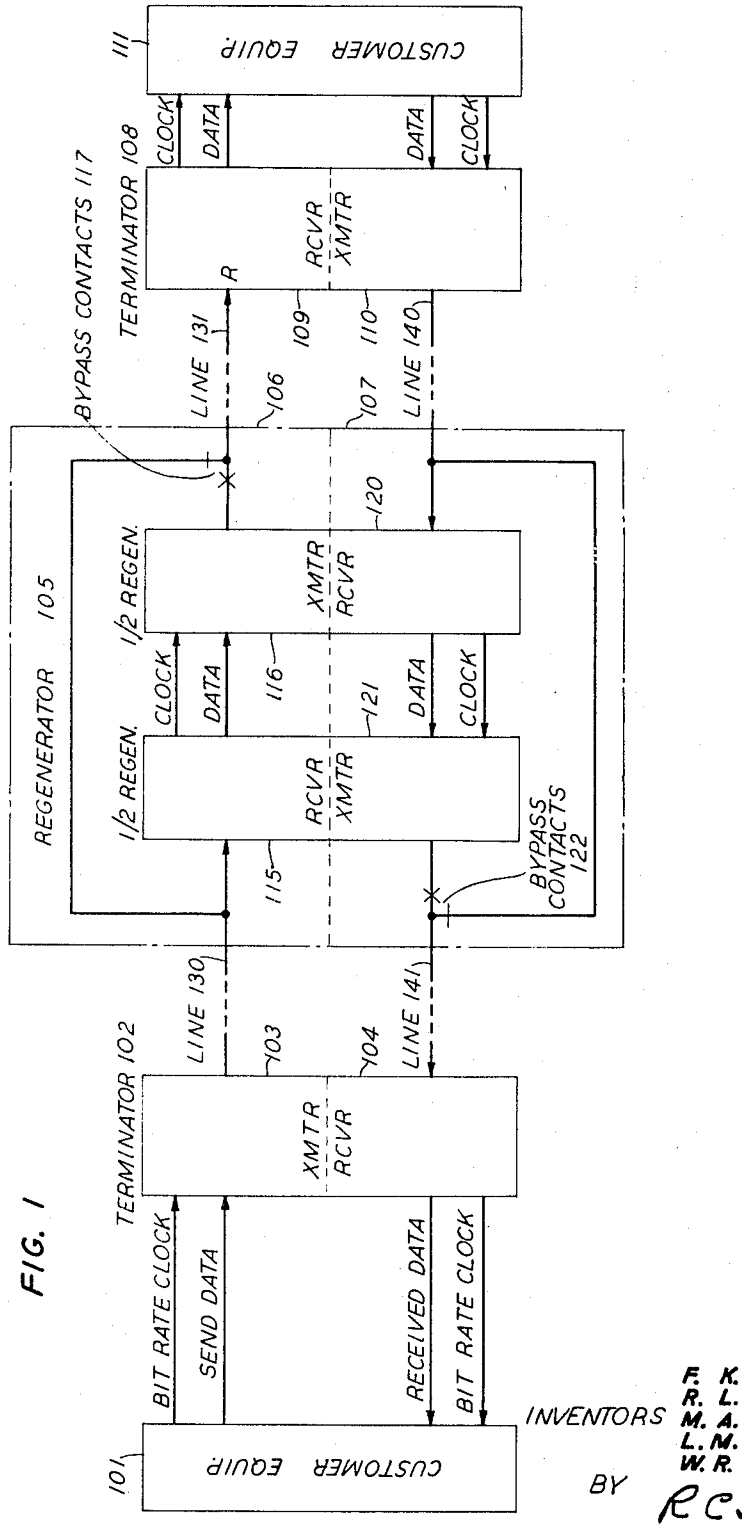
FIG. 1 shows in block form the circuits and equipment which cooperate to form a synchronous data transmission system with intervening regenerators in accordance with this invention.

Referring now to FIG. 1, the customer equipment is generally indicated by blocks 101 and 111, which equipment individually may provide a data source, a data sink and a bit rate clock. The data source and the bit rate clock function to pass data signals and clock signals over individual output leads to associated terminator sets, such as terminator 102 and terminator 108. The data sink is connected to a pair of incoming leads extending from the associated terminator sets, which leads individually provide data signals and clock signals whereby the data sink may record, process or store the received data in accordance with the requirements of the customer.

Each of terminators 102 and 108 comprise a transmitter portion, such as transmitter 103 in terminator 102, and a receiver portion, such as receiver 104 in terminator 102. Preferably, the terminator set is of the type disclosed in Patent No. 3,128,343, issued to P. A. Baker on Apr. 7, 1964. As disclosed in the Baker patent, the transmitter portion of the set utilizes received serial data from an input lead such as the send data lead in FIG. 1 together with clock signals from timing circuits to convert the data to pairs of binary digits or dibits which are phase modulated in a manner wherein phase shift is provided for each bit pair, which shift being useful when recovered for indicating signal transition or crossover. The modulated signals are then transmitted to an outgoing line circuit, such as line 130 in FIG. 1. The receiver portion of the set, as disclosed in the Baker patent, provides demodulation and registration of these phase modulated signals together with the recovery of the clock originated timing signals. Thus, signals received from a line, such as line 141, are demodulated and the recovered data, together with the recovered clock signals, are applied to outgoing leads, such as the received data lead and the bit rate clock lead extending to customer equipment 101 in FIG. 1.

The data communication system in accordance with this invention includes one or more data regenerator repeaters interposed between terminator 102 and terminator 108. Outgoing line 130 of terminator 102 thus extends to a regenerator, such as regenerator 105, and thence in series to other regenerators as they are necessary and finally to line 131 which conveys the incoming signals to receiver 109 of terminator 108. In the same manner outgoing line 140 of transmitter portion 110 of terminator 108 extends to incoming line 141 by way of the intervening regenerators.

Considering now regenerator 105, the regenerator generally comprises a two-way repeater wherein one repeater portion, generally indicated by block 106, functions to repeat the signals from terminator 102 which are destined for terminator 108 and the other repeater portion, generally indicated by block 107, functions to repeat the signals from terminator 108 which are being sent to terminator 102. In general, repeater 106 includes receiver portion 115 and transmitter portion 116, whereas repeater 107 includes receiver portion 120 and transmitter portion 121. It is noted that receiver portion 115 and transmitter portion 121 comprise a terminator set similar to terminator 102 but modified in accordance with this invention, as described hereinafter. Similarly, transmitter portion 116 and receiver portion 120 comprise a terminator set substantially identical to the terminator set comprising transmitter portion 121 and receiver portion 115.

In addition to regenerating signals, regenerator 105 also functions to bypass signals from line 130 without regeneration thereof by way of bypass contacts 117 and, in addition thereto, to bypass signals from line 140 to line 141 via bypass contacts 122. In the initial condition, bypass contacts 117 are arranged to directly connect the bypass path from line 130 to line 131 and open the connection between the output of transmitter 116 and line 131. This situation also exists when non-compatible signals, analog or digital and, of course, noise, are being applied to line 130. Consequently these signals are bypassed around regenerator 105 and passed to line 131 without delay of the signals since a direct connection is made with no intermediate equipment having inherent delay.

As described in detail hereinafter, when transmitter 103 sends data and compatible data signals are thus received by regenerator 105, bypass contacts 117 are operated, opening the bypass connection between lines 130 and 131 and extending line 131 to the output of transmitter 116. Accordingly, data signals on line 130 are recovered by receiver 115 and retransmitted by transmitter 116 to provide regeneration thereof. In addition, as is well known in the art, receiver 115 and transmitter 116 provide inherent delay of data signals. To preclude significant phase shift of data signals regenerated by regenerator 105 with respect to data signals bypassed around regenerator 105 prior to the operation of bypass contacts 117, additional delay is provided to each of receiver 115 and transmitter 116 whereby both receiver 115 and transmitter 116 individually and together provide a cumulative delay equal to an integral number of data signal intervals. Accordingly, any delay due to the operation of regenerator 105 comprises a plurality of data intervals and the relative phase of the signals is not shifted by the operation of contacts 117.

Since receiver portion 120 and transmitter portion 121, together with bypass contacts 122 in repeater 107, are arranged in substantially the same manner as receiver portion 115, transmitter portion 116 and bypass contacts 117 in repeater 106, data signals from line 140 are similarly bypassed when non-compatible signals are applied thereto and regenerated as transmitter 110 starts to send, thereby applying compatible signals to receiver portion 120, the phase shift of repeater portion 107 similarly being eliminated by rendering the delay thereof equal to an integral number of data signal intervals.

Figure 2:
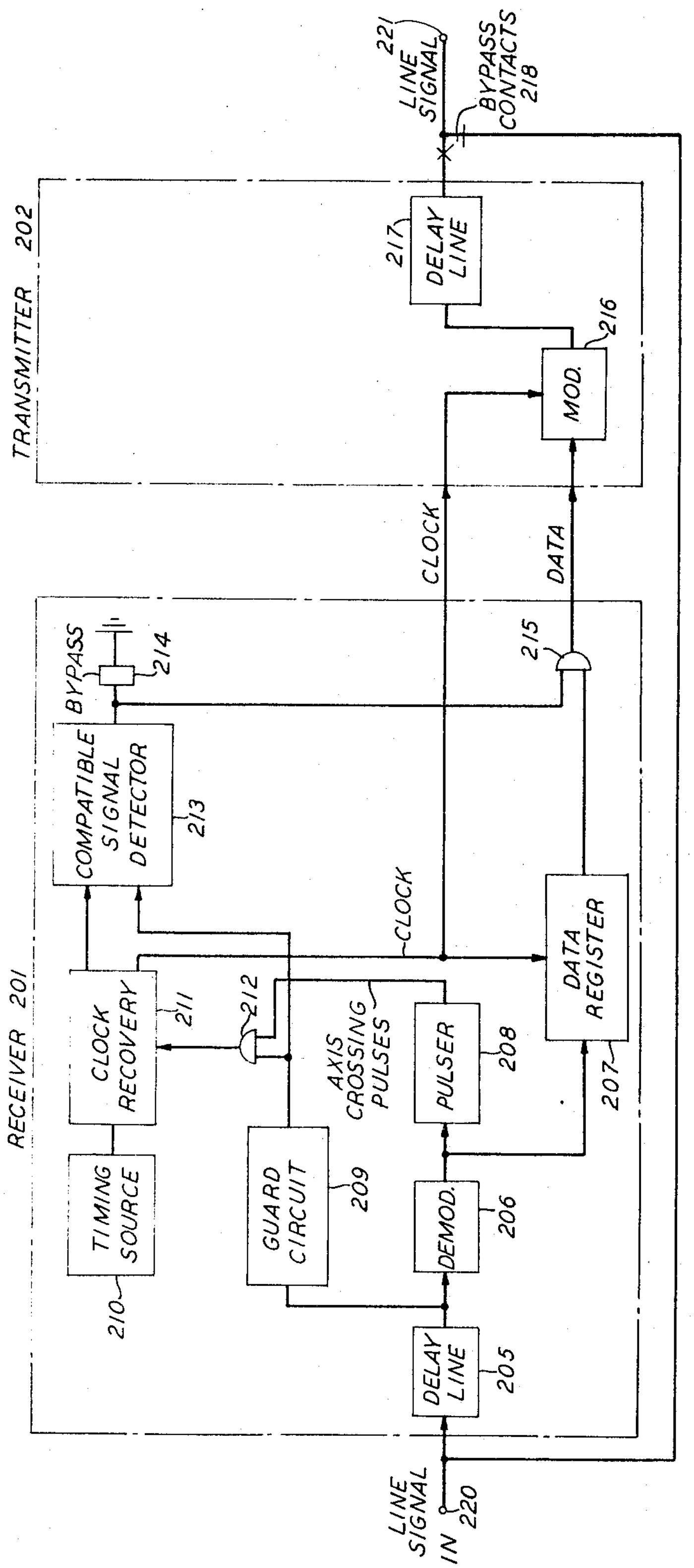
FIG. 2 illustrates the details of the circuits and equipment of a repeater in accordance with this invention.

A one-way repeater of the type generally indicated by block 106 in FIG. 1 is shown in FIG. 2 wherein receiver 201, transmitter 202 and bypass contacts 218 correspond to receiver 115, transmitter 116 and bypass contacts 117, respectively, in repeater 106 in FIG. 1. Incoming line signals are received on terminal 220 and, with bypass contacts 218 unoperated, bypassed around receiver 201 and transmitter 202 by way of the back contacts of bypass contacts 218 to output terminal 221. With the contacts operated, the bypass path is opened and output terminal 221 extends through the make contacts of bypass contacts 218 to the output of transmitter 202.

The incoming line signals on line 220 are also applied to receiver 201 and specifically to delay line 205 in receiver 201. Delay line 205 provides any conventional delay path for line signals, the delay thereof capable of being varied for reasons described hereinafter. In any event, the delayed line signals as the output of delay line 205 are applied in parallel to guard circuit 209 and demodulator 206.

Demodulator 206 operates together with data register 207 and, with a clock signal applied to data register 207, to recover the data bit stream from the incoming line signals. Data register 207, in turn, under the control of a clock signal applied thereto, passes the registered bits to gate 215, which, when enabled, passes the data bits to an output data lead which extends to transmitter 202. Preferably, the demodulator and data register utilized to provide the above described functions are of the type disclosed in the above mentioned patent of P. A. Baker.

The output of demodulator 206 is also extended to pulser 208. Pulser 208 may conveniently be a one-shot multivibrator which operates on the data signal crossovers of the recovered data stream to provide a pulse in response to each crossover. This pulse thus comprises an axis crossing pulse which is applied through gate 212, when enabled, and thence to clock recovery circuit 211 for reasons described hereinafter.

As previously disclosed, the output of delay line 205 also extends to guard circuit 209. Guard circuit 209 preferably comprises an arrangement for comparing the received in-band signal level with the level of out-of-band signals, if any, to indicate whether the incoming signals are non-data signals, such as voice or noise, or signals not compatible with the data receiver. In any event, assuming the incoming data signal threshold is satisfactory in the absence of non-compatible or non-data signals, guard circuit 209 provides a signal condition to the output thereof indicative thereof of this satisfactory reception. This signal condition is passed to one input of gate 212 and to an input of compatible signal detector 213.

The recovery of the clock signal is provided by timing source 210 and clock recovery circuit 211. Timing source 210 may comprise any well known high speed oscillator which provides a high frequency pulse train, which pulse train is applied to clock recovery circuit 211. The function of clock recovery circuit 211 is to frequency divide the high frequency pulse train and provide, at the output thereof, a clock pulse, which clock pulse is passed to data register 207 to enable the register to pass the registered bits, as previously described, and, in addition, the clock pulse is passed to an output clock lead, which lead extends to transmitter 202.

To recover the clock signal, clock recovery circuit 211 examines the axis crossing pulses passed by gate 212, compares the phase of the axis crossing pulses with the clock pulse output of circuit 211 and advances or retards the operation of the frequency divider circuit in the event of phase error so that the phase of the clock pulse is modified to bring it into phase with the incoming line signals. In addition, clock recovery circuit 211 detects the magnitude of the phase difference between the incoming line signals and the clock pulse and in accordance therewith signals compatible signal detector 213 when a large phase error exists. This phase errors signal is terminated when clock recovery circuit 211 determines that the phase of the clock pulse has been corrected. A clock recovery circuit suitable for use in receiver 201 for providing the above described functions is disclosed in the copending application of M. A. Logan and H. C. Schroeder (Case 26–2) filed concurrently herewith.

As previously described, two inputs are applied to compatible signal detector 213, one from guard circuit 209 and the other from clock recovery circuit 211. Guard circuit 209 indicates when compatible signals are being received from the incoming line while clock recovery circuit 211 signals when the recovered clock signals are in phase with the incoming signals. Compatible signal detector 213 is arranged to provide an enabling signal at the output thereof when the incoming line signals are compatible and the clock signals are substantially in phase with the incoming signals. In the event, however, that the incoming line signals are not compatible or that a loss of phase synchronism does occur, then the enabling signal output of compatible signal detector 213 is removed until compatible signals are again received and the clock signals are again in phase. A compatible detector suitable for use in this arrangement is disclosed in the above mentioned application of M. A. Logan et al.

The output of compatible signal detector 213 extends to the core of bypass relay 214 and to gate 215. When the enabling signal is applied to this output lead, bypass relay 214 is energized and gate 215 is enabled. Accordingly, bypass contacts 218 are operated to open the bypass path and connect output terminal 221 to transmitter 202. In addition, with gate 215 enabled, the data bits from data register 207 are passed to transmitter 202 by way of the data line output of receiver 201.

The operation of demodulator 206, together with data register 207 and gate 215, provides an inherent delay of the data stream, resulting in a phase shift between the input to receiver 201 and the output of receiver 201 to the data line. The function of delay line 205 is to provide additional delay of the data stream, whereby the total cumulative delay through the various elements in receiver 201 is equal to an integral number of data signal intervals. Accordingly, although receiver 201 provides delay, the phase of the output data signals is the same as the phase of the incoming line signals.

It is noted that the delay may be provided at the output of register 207 rather than on the input line side, utilizing a delay path suitable for the data stream. It is also noted that the output clock lead and the output data lead of receiver 201 may extend to customer equipment, which customer may also, for example, be monitoring the line for other signals. Since the customer may provide independent synchronization and timing recovery, it is, therefore, desirable that receiver 201 provides a delay interval which eliminates phase shift of the incoming line signals with respect to the phase of the output data stream.

In accordance with the illustrative embodiment shown in FIG. 2, the output clock lead and the output data lead in receiver 201 extend to transmitter 202. These leads further extend to modulator 216 in transmitter 202. The function of modulator 216 is to convert the serial data from the incoming data line to pairs of binary digits or dibits and under the control of the clock signal to phase modulate the dibits in the manner described in the above identified Baker patent. The output of modulator 216 is then applied to delay line 217, which delay line comprises any conventional arrangement which may be adjusted to provide desired delay to data signals. The delay may, of course, also be provided at the input of modulator 216.

Modulator 216 provides an inherent delay whereby relative phase shift between the incoming and outgoing data signals results. The function of delay line 217 is to provide delay in addition to the delay of modulator 216 whereby the cumulative delay equals an integral multiple number of data signal intervals. Accordingly, the incoming data stream and the outgoing data signals of transmitter 202 are maintained in phase. These signals are then passed to output terminal 221, assuming that bypass relay 214 is energized and bypass contacts 218 are thereby operated. Thus, as previously described, receiver 201 and transmitter 202 individually and together provide cumulative delay equal to an integral number of data signal intervals. Accordingly, when the incoming line signals are transferred from the bypass path to the path through the regenerator the relative phase of the signals is maintained.

What is claimed is:

1. In a synchronous data signalling system wherein synchronizing signals separated by fixed time intervale are recoverable from the data signals, a transmitter for sending said synchronous data signals, a data signal receiver, at least one repeater between said transmitter and receiver for regenerating said signals, said repeater inherently providing a delay of said regenerated signals, intermittently operated means having a negligible inherent delay for passing said signals from the input of said repeater to the output thereof to by-pass said repeater, and delay means external to and connected in series with said repeater between said input and said output for delaying said regenerated signals to provide an accumulative delay interval with the inherent delay of said repeater which exceeds the delay of said intermittently operated means by an interval equal to an integral multiple of said fixed time intervals.

2. In a synchronous data signaling system in accordance with claim 1 wherein said repeater includes, in series, a receiver portion for detecting incoming synchronous data signals and a transmitting portion for retransmitting said detected data signals, said receiver portion inherently providing a delay of said detected signals, and wherein said delay means includes means connected to said receiver portion for delaying said detected signals to provide an accumulative delay interval with the inherent delay of said receiver portion equal to an integral multiple number of said fixed time intervals.

3. In a synchronous data signaling system in accordance with claim 2 wherein said transmitting portion inherently provides a delay of said retransmitted signals and wherein said delay means further includes means connected to said transmitting portion for delaying said retransmitted signals to provide an accumulative delay interval with the inherent delay of said transmitting portion equal to an integral multiple number of said fixed time intervals.

References Cited

UNITED STATES PATENTS

| | | |
|---|---|---|
| 2,612,560 | 9/1952 | Rea. |
| 3,072,744 | 1/1963 | Bowers. |
| 3,202,769 | 8/1965 | Coleman. |

THOMAS A. ROBINSON, *Primary Examiner.*

M. M. CURTIS, *Assistant Examiner.*

U.S. Cl. X.R.

178—70; 328—164